United States Patent

Innes et al.

[11] Patent Number: 5,851,379
[45] Date of Patent: Dec. 22, 1998

[54] REFORMING PROCESS USING MONOFUNCTIONAL CATALYST CONTAINING BISMUTH

[75] Inventors: Robert A. Innes, San Rafael, Calif.; Michio Sugimoto; Tetsuya Fukunaga, both of Sodegaura, Japan

[73] Assignees: Chevron Chemical Company, San Ramon, Calif.; Idemitsu Kosan Co., Ltd., Japan

[21] Appl. No.: 995,588

[22] Filed: Dec. 22, 1997

[51] Int. Cl.[6] .................. C10G 35/085; C10G 35/095
[52] U.S. Cl. .................. 208/138; 208/134; 208/135; 208/137; 208/139; 585/444; 585/481; 585/482; 585/486; 585/489; 502/354; 502/74
[58] Field of Search .................. 208/134, 135, 208/137, 138, 139; 585/444, 481, 482, 486, 489; 502/354, 74

[56] References Cited

U.S. PATENT DOCUMENTS

| | | | |
|---|---|---|---|
| Re. 33,323 | 9/1990 | Roarty et al. | 208/79 |
| 4,681,865 | 7/1987 | Katsuno et al. | 502/74 |
| 4,698,322 | 10/1987 | Santilli et al. | 502/66 |
| 5,294,579 | 3/1994 | Ohashi et al. | 502/66 |
| 5,354,933 | 10/1994 | Ohashi et al. | 585/419 |
| 5,472,593 | 12/1995 | Gosling et al. | 208/65 |
| 5,624,656 | 4/1997 | Veduijn et al. | 423/700 |

*Primary Examiner*—Glenn Caldarola
*Assistant Examiner*—Nadine Preisch
*Attorney, Agent, or Firm*—T. G. DeJonghe

[57] ABSTRACT

A catalytic reforming process is disclosed using a catalyst containing a Group VIII metal, low amounts of bismuth, and a zeolite L. The catalyst is a non-acidic, monofunctional reforming catalyst. Preferably, the catalyst contains one or more halogens. Preferably, the feed includes $C_8$ hydrocarbons. The addition of small amounts of bismuth increase or substantially maintain catalyst stability. Unexpectedly low dealkylation rates are achieved using the catalyst while reforming to produce aromatics, especially to produce xylenes such as paraxylene.

7 Claims, No Drawings

REFORMING PROCESS USING MONOFUNCTIONAL CATALYST CONTAINING BISMUTH

BACKGROUND OF THE INVENTION

The present invention relates to reforming, especially dehydrocyclizing, hydrocarbons to form aromatics using a catalyst containing zeolite L. Reforming embraces several reactions, such as dehydrogenation, isomerization, dehydroisomerization, cyclization and dehydrocyclization. Dehydrocyclization is the most important reaction. Thus, in the process of the present invention, paraffins and naphthenes are converted to aromatics in a reforming reaction zone.

The present invention particularly relates to catalytic reforming using a monofunctional catalyst wherein the catalyst comprises a zeolite L, a Group VIII metal, and a promoter.

In particular, catalysts having platinum on potassium form L-zeolite exchanged with a rubidium or cesium salt were claimed by Bernard and Nury to achieve exceptionally high selectivity for n-hexane conversion to benzene. As disclosed in the Bernard and Nury patent, the L zeolites are typically synthesized in the potassium form. A portion, usually not more than 80%, of the potassium cations can be exchanged so that other cations replace the exchangeable potassium.

Having discovered a highly selective catalyst, commercialization seemed promising. Unfortunately, that was not the case, because the high selectivity, L-zeolite catalysts did not achieve long enough run length to make them feasible for use in catalytic reforming. U.S. Pat. No. 4,456,527 discloses the surprising finding that if the sulfur content of the feed was reduced to ultra low levels, below levels used in the past for catalysts especially sensitive to sulfur, that then long run lengths could be achieved with the L-zeolite non-acidic catalyst. Specifically, it was found that the concentration of sulfur in the hydrocarbon feed to the L-zeolite catalyst should be at ultra low levels, preferably less than 100 parts per billion (ppb), more preferably less than 50 ppb, to achieve improved stability/activity for the catalyst used.

Bismuth has been used as promoter in several alumina supported, multi-metallic, bifunctional (acidic) reforming catalysts reported in the patent literature. Pertinent U.S. patents include U.S. Pat. Nos. 3,878,089; 3,888,763; 3,940,329; 3,981,795; 4,036,743; 4,036,903, and 4,115,254. These acidic reforming catalyst compositions usually contain bismuth and platinum in a 0.1:1.0 to 1.0:1.0 atomic ratio, plus an additional metal such as iridium, rhodium, cobalt or nickel. As mentioned, these catalysts are acidic and are bifunctional. A bifunctional reforming catalyst is one which relies on both acidic sites and metal sites (particularly Group VIII metals) for its catalytic properties. These acidic catalysts containing bismuth, such as in the references just cited, are not based on zeolite L, are not monofunctional, and do not focus on low amounts of bismuth relative to Group VIII metal.

SUMMARY OF THE INVENTION

According to the present invention, a process is provided for converting feed hydrocarbons, particularly paraffinic hydrocarbons, to aromatics. The process comprises contacting the feed, under catalytic reforming conditions, with a monofunctional reforming catalyst comprising bismuth and platinum in a 0.01 to 0.25 atomic ratio and zeolite L.

Thus, important aspects of the present invention include the focus on monofunctional activity of the catalyst, the use of bismuth in the catalyst, and the use of zeolite L in the catalyst.

Surprisingly, we have found that bismuth is especially effective for reducing the amount of aromatics dealkylation occurring in the reforming process. Thus, relatively low amounts of bismuth, such as 0.01 to 0.25 atoms of bismuth per atom of platinum, can reduce aromatics dealkylation while improving or substantially maintaining run length and total aromatics selectivity.

Reduced dealkylation is particularly advantageous in producing alkyl aromatics, such as toluene and xylenes.

Accordingly, among other factors, the present invention is based on our findings that the catalysts as defined herein, which catalysts are monofunctional, have a zeolite L component and contain small amounts of bismuth relative to platinum, result in unexpectedly low dealkylation and high aromatics and hydrogen yields during reforming, while also exhibiting excellent stability.

The preferred catalysts of the invention contain bismuth and platinum in a 0.01 to 0.12 atomic ratio. More preferably, the bismuth to platinum atomic ratio is between 0.02 to 0.08.

As stated above, a particular advantage of the present invention is achievement of low dealkylation during reforming. This is especially advantageous when the feed to the reforming process includes aliphatic, especially paraffinic, hydrocarbons having seven or more carbon atoms. $C_6$ to $C_{12}$, or $C_6$ to $C_{11}$, $C_6$ to $C_{10}$, etc., down to $C_6$ to $C_7$ are advantageous feeds. Including $C_8$'s in the feed is particularly advantageous for the present process because xylene, especially paraxylene, are particularly valuable aromatics. $C_6$ to $C_8$ is an especially advantageous feed for the present invention.

A catalytic reforming catalyst is provided, in accordance with the catalysts described herein.

DETAILED DESCRIPTION OF THE INVENTION

The catalyst used in the process of the present invention comprises platinum, bismuth and zeolite L. The catalyst of the present invention is a non-acidic, monofunctional catalyst.

We have found surprisingly good results are achieved, especially reduced aromatics dealkylation and low catalyst deactivation rates, by using a relatively small amount of bismuth in the catalyst. As stated above, the atomic ratio of bismuth to platinum may range from 0.01 to 0.25, preferably 0.01 to 0.12, more preferably 0.02 to 0.08.

The zeolite L component of the catalyst is described in published literature, such as U.S. Pat. No. 3,216,789. The chemical formula for zeolite L may be represented as follows:

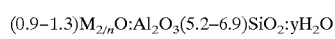

$$(0.9\text{--}1.3)M_{2/n}O:Al_2O_3(5.2\text{--}6.9)SiO_2:yH_2O$$

wherein M designates a cation, n represents the valence of M, and Y may be any value from 0 to about 9. Zeolite L, its X-ray diffraction pattern, its properties, and method for its preparation are described in detail in U.S. Pat. No. 3,216,789. Zeolite L has been characterized in "Zeolite Molecular Sieves" by Donald W. Breck, John Wiley and Sons, 1974, (reprinted 1984 ) as having a framework comprising 18 tetrahedra unit cancrinite-type cages linked by double six rings in columns and cross-linked by single oxygen bridges to form planar 12 -membered rings. The hydrocarbon sorption pores for zeolite L are reportedly approximately 7 Å in diameter. The Breck reference and U.S. Pat. No. 3,216,789 are incorporated herein by reference, particularly with respect to their disclosure of zeolite L.

The various zeolites are generally defined in terms of their X-ray diffraction patterns. Several factors have an effect on the X-ray diffraction pattern of a zeolite. Such factors include temperature, pressure, crystal size, impurities and type of cations present. For instance, as the crystal size of the type-L zeolite becomes smaller, the X-ray diffraction pattern becomes somewhat broader and less precise. Thus, the term "zeolite" includes any of the various zeolites made of cancrinite cages having an X-ray diffraction pattern substantially the same as the X-ray diffraction patterns shown in U.S. Pat. No. 3,216,789. Type-L zeolites are conventionally synthesized in the potassium form, that is, in the theoretical formula previously given, most of the M cations are potassium. M cations are exchangeable so that a given type-L zeolite, for example, a type-L zeolite in the potassium form, can be used to obtain type-L zeolites containing other cations by subjecting the type-L zeolite to ion-exchange treatment in an aqueous solution of an appropriate salt or salts. However, it is difficult to exchange all the original cations, for example, potassium, since some cations in the zeolite are in sites which are difficult for the reagents to reach. Preferred L zeolites for use in the present invention are those synthesized in the potassium form.

Examples of bifunctional catalysts include platinum on acidic alumina as disclosed in U.S. Pat. No. 3,006,841 to Haensel; platinum-rhenium on acidic alumina as disclosed in U.S. Pat. No. 3,415,737 to Kluksdahl; and platinum-iridium with bismuth on an acidic carrier as disclosed in U.S. Pat. No. 3,878,089 to Wilhelm (see also the other acidic catalysts containing bismuth, cited above in the Background section).

According to an especially preferred embodiment of the present invention, the non-acidic, monofunctional catalyst used in the process of the present invention contains one or more halogens. In view of the fact that the catalysts of the present invention are non-acidic catalysts, this may be confusing at first, as a non-acidic catalyst, in that halogens are often used to contribute to the acidity of alumina supports for acidic, bifunctional reforming catalysts. However, the use of halogens with catalysts based on zeolite L can be accomplished while retaining the non-acidic, monofunctional characteristic of the catalyst. Methods for making non-acidic halogen containing zeolite L based catalysts are disclosed in the RAULO and IKC references cited above in the Background section.

TABLE A

| Feed Description | |
|---|---|
| ASTM D 86 | °F. |
| LV% St | 145 |
| 10 | 184 |
| 30 | 198 |
| 50 | 219 |
| 70 | 243 |
| 90 | 262 |
| EP | 295 |
| Gravity, °API | 65.8 |
| Carbon No. Distribution-wt. % | |
| $C_5$ | 1.82 |
| $C_6$ | 27.72 |
| $C_7$ | 22.69 |
| $C_8$ | 33.77 |
| $C_9$ | 13.29 |
| $C_{10}$ | 0.72 |

TABLE A-continued

| Feed Description | |
|---|---|
| ASTM D 86 | °F. |
| PNA-wt. % | |
| Paraffins (n+i) | 72.32 |
| Naphthenes | 17.67 |
| Aromatics | 9.37 |
| Unknown | 0.64 |
| Total | 100.00 |

Preferably, the catalyst used in the catalytic reforming reaction zone of the present invention is bound. Binding the catalyst improves its crush strength, compared to a non-bound catalyst comprising platinum and bismuth on zeolite L powder. Preferred binders for the catalyst of the present invention are alumina or silica. Silica is especially preferred for the catalyst used in the present invention.

As the catalyst may be bound or unbound, the weight percentages given herein are based on the zeolite L component of the catalyst, unless otherwise indicated.

A preferred method to prepare catalysts in accord with the present invention comprises (a) impregnating non-acidic L zeolite extrudates with a solution of a bismuth compound in water or dilute acid as appropriate; (b) drying and calcining the extrudates; (c) impregnating the calcined extrudates with an aqueous solution containing one or more halogens, for example, ammonium chloride, ammonium fluoride, and also impregnating the extrudates with a platinum compound; and (d) drying and calcining the twice impregnated L zeolite extrudates. Preferably, the bismuth impregnation step is carried out prior to the platinum impregnation step.

Bismuth compounds which are soluble in water or dilute acid include bismuth citrate, bismuth trichloride, bismuth acetate, and bismuth nitrate.

EXAMPLES

Advantages of the Pt-Bi-zeolite L catalysts of the present invention are illustrated by the following examples.

Example 1

Preparation of Comparative Catalyst A

Twelve grams of KL-zeolite extrudates consisting of 80% zeolite and 20% silica binder were crushed and sieved to obtain 20–40mesh granules. The 20–40 mesh material was placed in an evaporating dish and dried four hours in a vacuum oven at 110° C. The oven-dried material was then calcined in a muffle furnace for two hours each at 200° C. and 500° C. A 5.0 gram portion of the calcined material was used to determine the incipient wetness point. The remaining calcined material was stored in a sealed jar inside a desiccator until needed for catalyst preparation. The incipient wetness volume was determined to be 2.48 mL for 5.0 grams of the calcined material.

An impregnating solution was prepared by dissolving 0.088 gram of ammonium fluoride, 0.041 gram of ammonium chloride, and 0.089 gram of platinum tetraammine chloride (56.4% Pt) in 2.0 mL of water and then diluting to a total volume of 2.48 mL. The calcined 20–40 mesh granules were then impregnated by adding this solution in dropwise fashion and stirring. The catalyst loading corresponded to 1.0 wt. % Pt, 0.9 wt. % F, and 0.9 wt. % Cl based on the weight of the calcined support.

The impregnated granules were allowed to soak overnight in a closed container. They were then dried in a vacuum oven for three hours at 110° C. The oven-dried material was calcined in a muffle furnace for 30 minutes at 150° C., then 30 minutes at 250° C., and finally for one hour at 300° C. The calcined catalyst was stored in a sealed vial until ready for testing.

Example 2

Preparation of catalyst B Containing 0.05 Bi/Pt

Catalyst B was prepared as follows. KL-zeolite extrudates from the same lot used in Example 1 were crushed and sieved to obtain 20–40 mesh granules for catalyst preparation. The 20–40 mesh material was dried and calcined as above.

A five gram portion of the calcined material was impregnated with 2.48 mL of atomic absorption standard solution containing 1000 $\mu$g/mL of bismuth in 5 wt. % $HNO_3$ solution. The bismuth loaded material was dried in a vacuum oven at 110° C. for four hours, then calcined in a muffle furnace for two hours at 300° C. and two hours at 500° C.

A second impregnating solution was prepared by dissolving 0.088 gram of ammonium fluoride, 0.041 gram of ammonium chloride, and 0.089 gram of platinum tetraammine chloride (56.4% Pt) in 2.0 mL of water and then diluting to a total volume of 2.48 mL. The calcined, bismuth containing, material was then impregnated by adding this second solution in dropwise fashion and stirring. The catalyst loading after both impregnations corresponded to 1.0 wt. % Pt, 0.05 wt. % Bi, 0.9 wt. % F, and 0.9 wt. % Cl based on the starting weight of the calcined support material. The bismuth/platinum atomic ratio was 0.047.

The impregnated granules were allowed to soak overnight in a closed container. They were then dried in a vacuum oven for three hours at 110° C. and calcined in a muffle furnace for 30 minutes at 150° C., another 30 minutes at 250° C., and one hour at 300° C. The calcined catalyst was stored in a sealed vial until ready for testing.

Example 3

Preparation of Catalyst C Containing 0.023 Bi/Pt

Catalyst C was prepared like Catalyst B in Example 2, except that water was substituted for half of the bismuth solution. The bismuth loading was therefore cut in half to 0.025 wt. %. The bismuth/platinum atomic ratio was 0.023.

Example 4

Preparation of Catalyst D Containing 0.14 Bi/Pt

Catalyst D was prepared like Catalyst B in Example 2, except that the bismuth impregnation step was repeated three times. The catalyst was dried after each of the first two bismuth impregnations but not calcined. After the third bismuth impregnation, the catalyst was dried and calcined as in Example 2.

The platinum impregnation step was the same as in Example 2. Therefore, the final loading was 1.0 wt. % Pt, 0.15 wt. % Bi, 0.9 wt. % F, and 0.9 wt. % Cl based on the starting weight of the calcined support material. The bismuth/platinum atomic ratio was 0.14.

Example 5

Testing of Comparative Catalyst A Which Did Not Contain Bismuth

Catalysts A, B, C and D were tested as follows. A barrel of raffinate from a commercial aromatics extraction plant was hydrotreated to obtain a paraffinic feed. The feed composition by carbon number was 2.2 wt. % $C_5$, 41.6 wt. % $C_6$, 39.2 wt. % $C_7$, 15.5 wt. % $C_8$, and 1.6 wt. % $C_9$+. By hydrocarbon type, the breakdown was 83 wt. % paraffins and olefins, 9.4 wt. % naphthenes, and 7.4 wt. % aromatics.

The catalysts were tested in a microreactor unit equipped with a hydrogen mass flow controller, a nitrogen mass flow controller, a tubular microreactor heated by a multi-zone electric furnace, and an on-line gas chromatograph. The preheat zone of the tubular reactor was packed with a sulfur sorbent which eliminated the last traces of sulfur from the feed. The catalyst was charged below the sulfur sorbent.

Each catalyst was charged to the reactor and dried by heating to 500° F. in flowing nitrogen. The nitrogen was then replaced with hydrogen to initiate catalyst reduction. The temperature was then ramped up to 900° F. overnight and held for several hours at 900° F. to complete the reduction and dryout.

The activated catalysts were tested for aromatization activity under the following conditions. The hydrocarbon feed weight hourly space velocity was 4.4. The molar ratio hydrogen to hydrocarbon feed was 5.0. The reactor inlet pressure was 50 psig, and the initial reaction temperature was 875° F. After the initial activity was determined, the temperature was adjusted to give about 70% $C_6$+ non-aromatics conversion. After this adjustment, the temperature was held constant and conversion was allowed to fall with time on-stream.

The results for Catalyst A are shown in Table 1. The catalyst exhibited good stability. Conversion fell about seven percent during the period from 1.0 to 11.0 days on-stream. In a commercial unit, the temperature would be raised to compensate for the loss of activity. The $C_8$ aromatics content of the product at 71.3% conversion was 9.5 wt. %. This was about 67% of the theoretical yield based on $C_8$ aromatics in feed and $C_8$ non-aromatics converted.

TABLE 1

| TEST OF CATALYST A CONTAINING NO BISMUTH | | | | |
|---|---|---|---|---|
| | FEED | PRODUCTS | | |
| Days | | 0.04 | 1.04 | 6.04 | 11.17 |
| Temperature, °F. | | 875 | 875 | 875 | 875 |
| Conversion, wt. % | | 71.3 | 64.7 | 61.1 | 57.6 |
| Composition, wt. % Non-Aromatics | | | | | |
| $H_2$ | | 4.3 | 4.3 | 4.1 | 3.9 |
| $C_1$ | | 2.4 | 1.8 | 1.5 | 1.3 |
| $C_2$ | | 1.1 | 0.7 | 0.6 | 0.6 |
| $C_3$ | | 1.7 | 0.6 | 0.4 | 0.4 |
| $C_4$ | | 2.0 | 0.8 | 0.6 | 0.5 |
| $C_5$ | 2.2 | 4.3 | 3.4 | 3.2 | 3.1 |
| $C_6$ | 41.5 | 18.8 | 20.9 | 21.6 | 22.6 |
| $C_7$ | 37.7 | 6.4 | 9.5 | 11.4 | 13.1 |
| $C_8$ | 10.4 | 0.7 | 1.5 | 2.0 | 2.5 |
| $C_9$+ | 0.8 | 0.0 | 0.0 | 0.1 | 0.1 |
| Aromatics | | | | | |
| Benzene | 0.1 | 20.7 | 19.1 | 18.3 | 17.1 |
| Toluene | 1.5 | 26.4 | 25.9 | 24.9 | 23.7 |

TABLE 1-continued

TEST OF CATALYST A CONTAINING NO BISMUTH

|  | FEED | PRODUCTS | | | |
|---|---|---|---|---|---|
| $C_8$ | 5.1 | 9.5 | 10.0 | 10.0 | 10.0 |
| $C_9$ | 0.8 | 0.7 | 0.8 | 0.8 | 0.9 |
| $C_{10}+$ |  | 1.0 | 0.6 | 0.4 | 0.2 |
| Total | 100.0 | 100.0 | 100.0 | 100.0 | 100.0 |

Example 6

Test of Catalyst B Containing 0.05 Bi/Pt

Catalyst B was tested under the same conditions as Catalyst A. The results are shown in Table 2. Catalyst B was initially less active than Catalyst A. However, it was very stable. Conversion fell only 3.6% in ten days. At 72% conversion, the yield of $C_8$ aromatics on feed was 11.0% which was 77% of the theoretical yield. This compares to 67% with Catalyst A.

TABLE 2

TEST OF CATALYST B (0.05 Bi/Pt)

|  | FEED | PRODUCTS | | | | | |
|---|---|---|---|---|---|---|---|
| Days |  | 0.04 | 0.17 | 1.17 | 1.29 | 6.29 | 11.29 |
| Temperature, °F. |  | 875 | 894 | 894 | 910 | 910 | 910 |
| Conversion, wt. % |  | 59.2 | 67.1 | 63.0 | 72.7 | 72.1 | 69.1 |
| Product Composition, wt. % |  |  |  |  |  |  |  |
| Non-Aromatics |  |  |  |  |  |  |  |
| $H_2$ |  | 4.3 | 4.5 | 4.5 | 4.7 | 4.7 | 4.7 |
| $C_1$ |  | 1.5 | 1.6 | 1.3 | 1.6 | 1.3 | 1.2 |
| $C_2$ |  | 0.9 | 0.8 | 0.6 | 0.7 | 0.7 | 0.7 |
| $C_3$ |  | 1.5 | 0.9 | 0.5 | 0.6 | 0.4 | 0.4 |
| $C_4$ |  | 1.6 | 1.0 | 0.6 | 0.7 | 0.5 | 0.5 |
| $C_5$ | 2.2 | 3.5 | 3.3 | 3.0 | 3.2 | 3.0 | 2.9 |
| $C_6$ | 41.5 | 23.9 | 20.3 | 21.2 | 16.9 | 16.4 | 17.9 |
| $C_7$ | 37.7 | 12.3 | 9.1 | 11.5 | 7.5 | 8.3 | 9.6 |
| $C_8+$ | 11.2 | 0.7 | 0.4 | 0.7 | 0.3 | 0.5 | 0.5 |
| Aromatics |  |  |  |  |  |  |  |
| Benzene | 0.1 | 14.7 | 18.8 | 18.0 | 22.6 | 23.0 | 21.6 |
| Toluene | 1.5 | 23.3 | 26.7 | 25.9 | 29.0 | 29.0 | 28.0 |
| $C_8$ | 5.1 | 10.2 | 10.8 | 10.8 | 10.8 | 11.0 | 11.0 |
| $C_9+$ | 0.8 | 1.8 | 1.9 | 1.4 | 1.5 | 1.2 | 1.1 |
| Total | 100.0 | 100.0 | 100.0 | 100.0 | 100.0 | 100.0 | 100.0 |

Example 7

Test of catalyst C (0.023 Bi/Pt)

Catalyst C was tested under the same conditions as Catalysts A and B. The results are shown in Table 3. Catalyst C was initially less active than Catalyst A, but more active than Catalyst B. It exhibited good stability after an initial line-out period. At 71% conversion, the yield of $C_8$ aromatics was 11.0%. This was 84% of the theoretical yield compared to 67% with Catalyst A.

TABLE 3

TEST OF CATALYST C (0.023 Bi/Pt)

| | Feed | PRODUCTS | | | | | |
|---|---|---|---|---|---|---|---|
| Days | | 0.04 | 0.16 | 1.16 | 5.16 | 10.18 | 12.76 |
| Temperature, °F. | | 875 | 901 | 901 | 901 | 901 | 901 |
| Conversion, wt. % | | 61.5 | 77.1 | 74.5 | 71.8 | 71.0 | 69.8 |
| Product Composition, wt. % | | | | | | | |
| Non-Aromatics | | | | | | | |
| $H_2$ | | 4.0 | 5.1 | 5.1 | 4.9 | 4.8 | 4.8 |
| $C_1$ | | 1.5 | 1.9 | 1.7 | 1.5 | 1.3 | 1.3 |
| $C_2$ | | 0.7 | 0.8 | 0.7 | 0.7 | 0.7 | 0.7 |
| $C_3$ | | 0.9 | 0.8 | 0.6 | 0.4 | 0.4 | 0.4 |
| $C_4$ | | 1.0 | 1.1 | 0.2 | 0.6 | 0.5 | 0.5 |
| $C_5$ | 2.2 | 3.3 | 3.6 | 3.3 | 3.1 | 4.7 | 4.6 |
| $C_6$ | 41.5 | 21.8 | 14.5 | 15.3 | 15.4 | 15.3 | 16.0 |
| $C_7$ | 37.7 | 11.1 | 5.5 | 6.6 | 8.5 | 9.1 | 9.4 |
| $C_8$ | 10.4 | 1.9 | 0.8 | 1.1 | 1.6 | 1.8 | 1.8 |
| $C_9+$ | 0.8 | 0.1 | 0.0 | 0.0 | 0.1 | 0.1 | 0.1 |
| Aromatics | | | | | | | |
| Benzene | 0.1 | 17.1 | 25.5 | 25.0 | 22.8 | 22.4 | 21.9 |
| Toluene | 1.5 | 24.3 | 28.7 | 28.8 | 28.1 | 27.0 | 26.9 |
| $C_8$ | 5.1 | 10.9 | 10.2 | 10.2 | 11.1 | 11.0 | 10.7 |
| $C_9$ | 0.8 | 1.0 | 0.8 | 0.8 | 0.9 | 0.9 | 0.9 |
| $C_{10}+$ | | 0.5 | 0.7 | 0.5 | 0.3 | 0.1 | 0.1 |
| Total | 100.0 | 100.0 | 100.0 | 100.0 | 100.0 | 100.0 | 100.0 |

Example 8

Test of Catalyst D Containing 0.14 Bi/Pt

Catalyst D contained more than the preferred amount of bismuth. When tested in the same fashion as Catalysts B and C, it exhibited relatively poor activity and stability but good $C_8$ aromatics selectivity. The results are shown in Table 4. The $C_8$ aromatics yield on feed at 69.1% conversion was 10.4 wt. %. This corresponded to 82% of the theoretical yield based on the amount of $C_8$ aromatics in the feed and the amount of $C_8$ non-aromatics converted.

TABLE 4

TEST OF CATALYST D (0.14 Bi/Pt)

| | Feed | PRODUCTS | | | | | |
|---|---|---|---|---|---|---|---|
| Days | | 0.04 | 0.29 | 1.29 | 1.42 | 6.42 | 11.29 |
| Temperature, °F. | | 875 | 925 | 925 | 963 | 963 | 963 |
| Conversion, wt. % | | 38.3 | 56.4 | 46.1 | 69.1 | 40.1 | 21.2 |
| Product Composition, wt. % | | | | | | | |
| Non-Aromatics | | | | | | | |
| $H_2$ | | 2.3 | 3.7 | 3.2 | 4.8 | 2.8 | 1.6 |
| $C_1$ | | 0.9 | 1.3 | 0.8 | 1.4 | 0.8 | 0.4 |
| $C_2$ | | 0.6 | 0.7 | 0.4 | 0.8 | 0.6 | 0.4 |
| $C_3$ | | 1.3 | 0.9 | 0.4 | 0.6 | 0.4 | 0.3 |
| $C_4$ | | 1.4 | 1.1 | 0.5 | 0.8 | 0.5 | 0.4 |
| $C_5$ | 2.2 | 3.2 | 3.2 | 2.7 | 3.2 | 2.9 | 2.6 |
| $C_6$ | 41.5 | 29.7 | 22.5 | 25.4 | 16.3 | 26.8 | 33.0 |
| $C_7$ | 37.7 | 21.9 | 14.2 | 19.0 | 9.7 | 21.9 | 30.0 |
| $C_8$ | 10.4 | 4.0 | 2.6 | 4.1 | 1.8 | 5.1 | 7.7 |
| $C_9+$ | 0.8 | 0.2 | 0.1 | 0.2 | 0.1 | 0.4 | 0.6 |
| Aromatics | | | | | | | |
| Benzene | 0.1 | 8.8 | 16.4 | 13.8 | 23.1 | 12.4 | 5.7 |
| Toluene | 1.5 | 14.7 | 21.3 | 18.2 | 25.2 | 15.5 | 8.6 |
| $C_8$ | 5.1 | 9.3 | 10.1 | 9.6 | 10.4 | 9.0 | 7.8 |
| $C_9$ | 0.8 | 1.1 | 1.1 | 1.1 | 1.0 | 1.0 | 1.0 |
| $C_{10}+$ | | 0.5 | 0.8 | 0.6 | 0.9 | 0.1 | 0.0 |
| Total | 100.0 | 100.0 | 100.0 | 100.0 | 100.0 | 100.0 | 100.0 |

The results in Examples 1–8 show that the addition of small amounts of bismuth significantly reduced the dealkylation of $C_8$ aromatics, while increasing or substantially maintaining catalyst stability. This is particularly advantageous in aromatics manufacturing complexes where the focus is on making paraxylene and benzene.

What is claimed is:

1. A process for reforming a hydrocarbon feed to obtain aromatics, comprising contacting the feed, under catalytic reforming conditions, with a monofunctional reforming catalyst comprising platinum, 0.01 to 0.25 atoms of bismuth per atom of platinum, and a zeolite L.

2. A process in accordance with claim 1 wherein the catalyst comprises 0.01 to 0.12 atoms of bismuth per atom of platinum.

3. A process in accordance with claim 1 wherein the catalyst comprises 0.02 to 0.08 atoms of bismuth per atom of platinum.

4. A process in accordance with claim 1 wherein the catalyst comprises one or more halogens.

5. A process in accordance with claim 4 wherein the catalyst comprises chlorine or fluorine or both, in a total halogen amount of 0.05 to 3.0 weight percent based on the zeolite L.

6. A process in accordance with claim 1 wherein the feed comprises $C_6$ to $C_{12}$ hydrocarbons.

7. A process in accordance with claim 1 wherein the feed is a $C_6$ to $C_7$ fraction, a $C_6$ to $C_8$ fraction, a $C_7$ to $C_8$ fraction, a $C_6$ to $C_9$ fraction, a $C_7$ to $C_9$ fraction, $C_7$ fraction, or a $C_8$ fraction.

* * * * *